United States Patent [19]

Yamaguchi et al.

[11] Patent Number: 5,775,367
[45] Date of Patent: Jul. 7, 1998

[54] SOLENOID VALVE CONTROL DEVICE

[75] Inventors: Naoki Yamaguchi, Nishinomiya; Osamu Akamatsu, Akashi, both of Japan

[73] Assignee: Westinghouse Air Brake Company, Wilmerding, Pa.

[21] Appl. No.: 801,851

[22] Filed: Feb. 21, 1997

[30] Foreign Application Priority Data

Feb. 22, 1996 [JP] Japan .................................. 8-062037

[51] Int. Cl.⁶ .................................................. F16K 31/12
[52] U.S. Cl. ........................ 137/487.5; 137/625.64
[58] Field of Search ..................... 137/487.5, 625.64; 251/30.01

[56] References Cited

U.S. PATENT DOCUMENTS

| | | | |
|---|---|---|---|
| 4,976,377 | 12/1990 | Higuchi | 137/487.5 |
| 5,197,508 | 3/1993 | Gottling | 137/625.4 |
| 5,313,964 | 5/1994 | Dausch | 137/387 |
| 5,562,125 | 10/1996 | Bray | 137/625.64 |

*Primary Examiner*—Denise L. Ferensic
*Assistant Examiner*—Ramyar Farid
*Attorney, Agent, or Firm*—James Ray & Associates

[57] ABSTRACT

Three-position solenoid valve which outputs an output pressure and can adopt exhaust, overlapping and supply positions. The output pressure is detected by an output pressure sensor and is fed back to a fuzzy control unit. Based on the difference between the output pressure and the command pressure corresponding to the pressure command signal from the brake control unit, such fuzzy control unit calculates a command current value for controlling the three-position solenoid valve by fuzzy reasoning. The command current value can adopt an essentially continuous value, and consequently the three-position solenoid valve can adopt a gentle exhaust state or a gentle supply state. In this way, sudden changes in the output pressure can be suppressed and the output pressure can be made to converge rapidly on the command pressure and eliminate overshoot and undershoot.

8 Claims, 5 Drawing Sheets

| MEMBERSHIP FUNCTIONS OF CONDITION PART | | | MEMBERSHIP FUNCTIONS OF CONCLUSION PART |
|---|---|---|---|
| SUITABLE RULE | PRESSURE DIFFERENCE | GRADIANT OF PRESSURE DIFFERENCE | OUTPUT |
| RULE NO.1 |  | MIN METHOD ⇨ |  |
| RULE NO.2 |  |  ⇨ |  |
| | | TAKE RESPECTIVE MIN VALUES | |
| RULE NO.3 |  |  ⇨ |  |
| RULE NO.5 |  | ⇨ |  |

PRESSURE DIFFERENCE 0.07 KGT/CM$^2$

GRADIANT 0 KGF/CM$^2$ PER SAMPLING PERIOD

MAX METHOD

INPUT TO FUZZY REASONING
- pressure difference between command and AC pressure (0.07 kgf/cm$^2$)
- gradient of AC pressure (0 kgf/cm$^2$ per sampling period)

CENTER OF GRAVITY POSITION = OUTPUT VALUE (mA)

FIG. 5

SOLENOID VALVE CONTROL DEVICE

FIELD OF THE INVENTION

The present invention relates, in general, to a solenoid valve control device and, more particularly, this invention relates to a solenoid valve control device that controls the switching of a three-position solenoid valve, which has supply, overlapping and exhaust positions, with a command current value, and which may be applied to a brake device for a railway vehicle.

BACKGROUND OF THE INVENTION

Pneumatic devices have hitherto been applied to brake devices for railroad cars. This type of device is configured so as to output an output pressure using a solenoid valve, amplify the volume of this output pressure into a brake pressure with a relay valve, and actuate the brake cylinder with this brake pressure.

A three-position solenoid valve, which has a first port connected to the atmosphere, a second port connected to the air supply reservoir, and a third port connected to the relay valve, may, for example, be applied as the solenoid valve for producing the output pressure. That is, this three-position solenoid valve can adopt an exhaust position for exhausting the air in the relay valve by connecting the first port with the third port, a supply position for supplying compressed air from the air supply reservoir to the relay valve by connecting the second port with the third port, and an overlapping ("lap") position for holding the output pressure by closing off all of the first, second and third ports.

Details of the configuration of such a three-position solenoid valve can be found in, "Examined Japanese Utility Model Publication" (JP-B-U) No. H 7-31020 (1995).

By operating a brake controller provided on the driver's seat of the railroad car, it is possible to output a brake command with a total of 8 levels from level 0 to level 7. Based on this brake command, the solenoid valve control device produces a three-level excitation current for controlling the position of the three-position solenoid valve to the exhaust position, supply position or overlapping position. When there is a difference between the excitation currents needed to move from the exhaust position to the overlapping position and from the supply position to the overlapping position, the excitation current corresponding to the overlapping position may also be set at two levels. In this case, an excitation current with a total of four levels may be input to the three-position solenoid valve.

However, with this configuration wherein the three-position solenoid valve is controlled with a three-level or four-level excitation current, it has not been possible to avoid the occurrence of overshoot or undershoot. Consequently, it takes some time for the pressure output from the three-position solenoid valve to converge on the brake command pressure, and as a result there has been the problem that the responsivity, until the desired brake pressure is obtained, is unavoidably poor.

Also, if overshoot or undershoot occurs, the position of the three-position solenoid valve must be repeatedly switched over until the output pressure converges on the brake command pressure, so that the lifetime of the three-position solenoid valve is reduced and there is a danger of the control becoming unstable.

If the above-mentioned overshoot and undershoot problems can be overcome, one can thus expect to achieve an improvement in the damping characteristics of the railroad car, together with increased lifetime of the brake device.

SUMMARY OF THE INVENTION

In a presently preferred embodiment of the present invention there is provided a solenoid valve control device, which is a control device for a three-position solenoid valve that is controlled by receiving a command current value corresponding to a pressure command signal, whereby it switches between a supply position which increases the output pressure, an exhaust position which decreases the output pressure, and an overlapping position which holds the output pressure. The solenoid valve control device is characterized in that it has an output pressure detecting means that will detect the output pressure of the three-position solenoid valve and a command current value calculating means that compares the output pressure signal from this output pressure detecting means with the pressure command signal and, based on the difference, calculates and outputs the command current value so as to make the output pressure signal match the pressure command signal. Further the command current value calculating means calculates and outputs the command current value, based on the difference between the output pressure signal and pressure command signal, as a current value ranging freely between the current value at which the solenoid valve adopts the supply position and the current value at which it adopts the exhaust position.

OBJECTS OF THE INVENTION

It is, therefore, one of primary objects of the present invention to provide a solenoid valve control device that can ameliorate the response characteristics by improving the way in which the three-position solenoid valve is controlled to output the output pressure.

Another object of the present invention is to provide a solenoid valve control device with enhanced longevity and reliability.

Still another object of the present invention is to provide a solenoid control device wherein the desired brake pressure can be reliably produced irrespective of the hysteresis characteristics of the driving resistance force.

Yet another object of the present invention is to provide a solenoid control device wherein it is possible to calculate the command current value so that overshoot and undershoot do not occur.

An additional object of the present invention is to provide a solenoid control device wherein it is possible to use fuzzy control means to calculate the command current value by using the membership functions of fuzzy sets corresponding respectively to "much larger", "somewhat larger", "roughly equal", "somewhat smaller", and "much smaller".

A further object of the present invention is to provide a solenoid control device wherein a time variation rate of the output signal is included in the input to the fuzzy reasoning in order to suppress or prevent overshoot and undershoot even more effectively.

Still yet another object of the present invention is to provide a solenoid control device wherein, it is preferable that the output pressure signal from the output pressure detecting means is compared with the pressure command signal, and the fuzzy control means calculates the command current value by using the membership functions of fuzzy sets corresponding respectively to "much larger", "somewhat larger", "roughly equal", "somewhat smaller", and "much smaller", and by using the membership function of a fuzzy set corresponding respectively to whether the time variation rate of the output pressure signal from the output pressure detecting means is "large and positive", "roughly zero", or "negative with a large absolute value".

It is also an object of the present invention to provide a solenoid control device wherein it is possible to implement accurate control of the output pressure by eliminating the hysteresis characteristics relating to the driving resistance force of the three-position solenoid valve.

In addition to the objects and advantages of the present invention which has been described in detail above, various other objects and advantages will become readily apparent to those persons skilled in solenoid valves from the following more detailed description of such invention, particularly, when such description is taken in conjunction with the attached drawing Figures and with the appended claims.

BRIEF DESCRIPTION OF THE PRESENTLY PREFERRED AND VARIOUS ALTERNATIVE EMBODIMENTS OF THE PRESENT INVENTION

Prior to proceeding to the more detailed description of the various embodiments of the invention, it should be noted that, for both the sake of clarity and understanding of the three position solenoid valve according to the present invention, identical components which have identical functions have been identified with identical reference numerals throughout the several views which have been illustrated in the attached drawing Figures.

An embodiment of a solenoid valve control device according to this invention is described in detail below.

Figure 1:
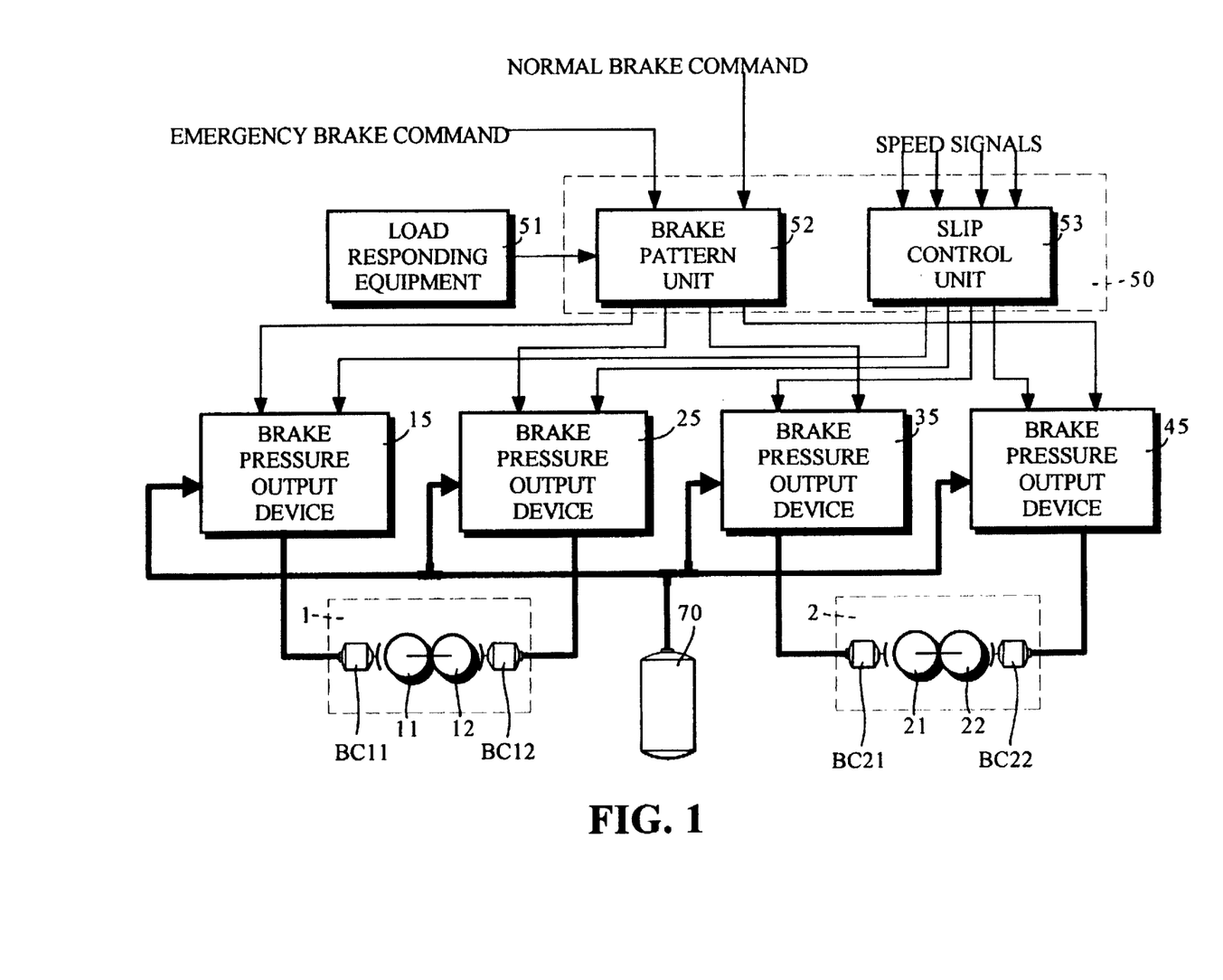
FIG. 1 is a block diagram showing the schematic configuration of a solenoid valve device according to one embodiment of the present invention.

FIG. 1 is a block diagram showing the schematic configuration of a railway vehicle brake control device to which one embodiment of this invention has been applied, wherein the configuration for a single car is shown.

In this embodiment, a car (not shown) is equipped with two trucks 1 and 2. The trucks 1 and 2 are each equipped with a pair of axles 11, 12 and 21, 22, respectively, and wheels (not shown) are fixed to the two ends of each axle. Pneumatically-operated brake cylinders BC11, BC12 and BC21, BC22 are installed in relation to each axle. The pair of brake cylinders provided on one truck are made so that their respective brake pressures are applied from brake pressure output devices 15, 25, 35 and 45.

The brake pressures output by such brake pressure output devices 15, 25, 35 and 45 are controlled based on a normal brake command or an emergency brake command depending on the operation of a brake controller provided for the engineer of the train, rotation rate signals for each axle, which are detected by speed sensors (not shown), and the output signal of a load-responding instrument 51 which detects either the load on the car or the load on the trucks 1 and 2.

More specifically, the normal brake command and emergency brake command are input to the brake pattern unit 52 of a brake control unit 50 along with the output signal of load-responding instrument 51. Based on the input signals, brake pattern unit 52 calculates the pressure command signals for each wheel in order to perform normal brake control and emergency brake control, and outputs individual command signals to brake pressure output devices 15, 25, 35 and 45.

Also, the speed signals from the speed sensors are input to a slip control unit 53 for preventing the wheels from slipping on the rails. This slip control unit 53 calculates pressure command signals for performing slip control and outputs signals to each brake pressure output device 15, 25, 35 and 45.

Brake pressure output devices 15, 25, 35 and 45 supply appropriate brake pressures to brake cylinders BC11, BC12 and BC21, BC22, respectively, based on the pressure command signals from brake control unit 50.

Figure 2:
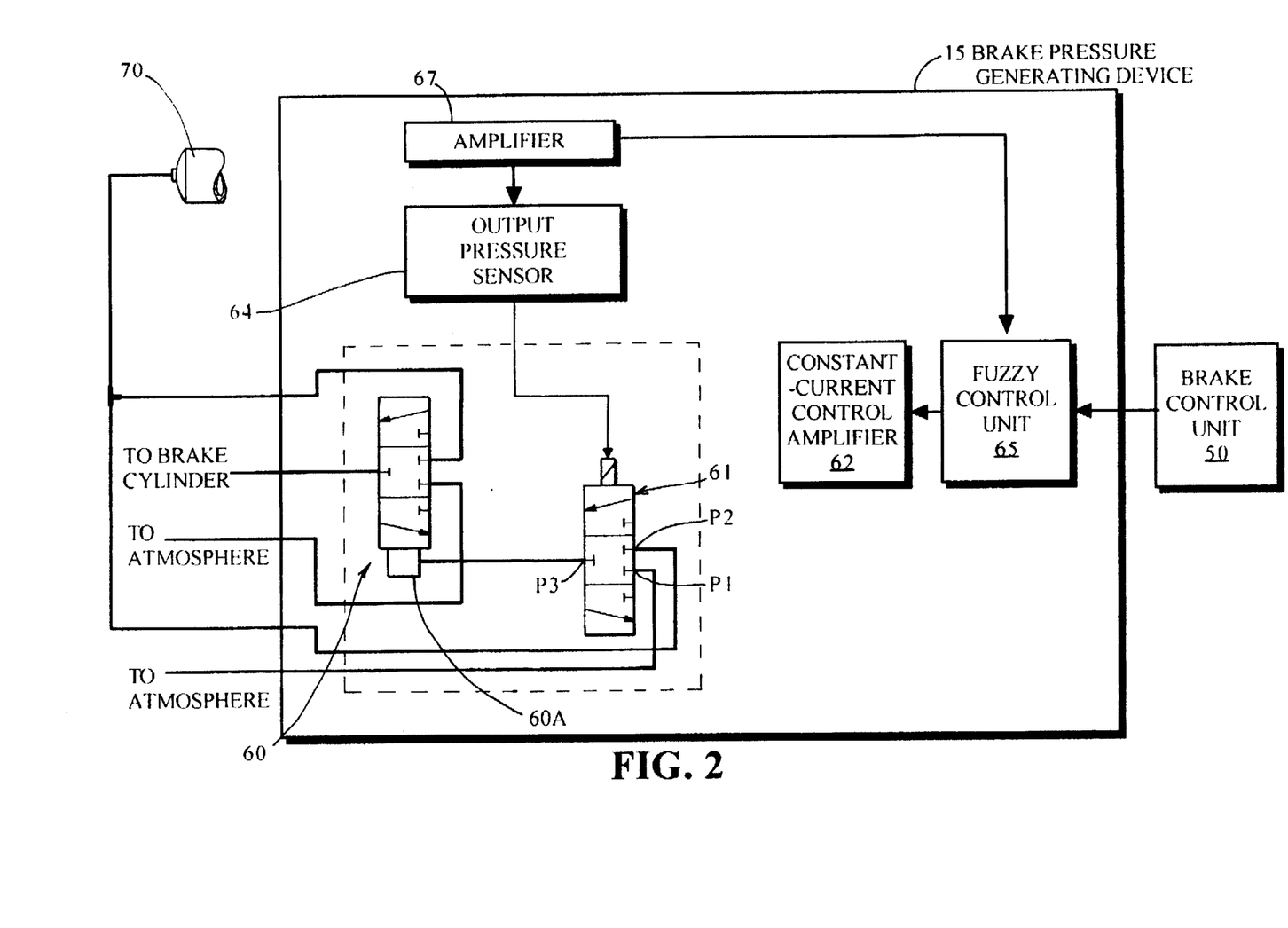
FIG. 2 is a block diagram showing the configuration of a brake pressure output device.

FIG. 2 is a block diagram illustrating, in simplified form, the configuration of the brake pressure output device 15 that corresponds to axle 11. It should be noted that the remaining brake pressure output devices 25, 35 and 45 have a similar configuration.

Brake pressure output device 15 comprises a relay valve 60 for supplying a brake pressure to the brake cylinder BC11, a three-position solenoid valve 61 that supplies the output pressure to relay valve 60, a constant-current control amplifier 62 that outputs a driving current for driving three-position solenoid valve 61, and a fuzzy control unit 65 that uses fuzzy reasoning to calculate and output a command current value for determining the current to be output by this constant-current control amplifier 62.

The pressure command signal from brake control unit 50 is input to fuzzy control unit 65. Furthermore, there is an output pressure sensor 64 for detecting the output pressure output by three-position solenoid valve 61 installed in relation to this three-position solenoid valve 61. The output pressure signal from this output pressure sensor 64 is amplified by amplifier 67 and fed back to fuzzy control unit 65. Fuzzy control unit 65 regularly samples the output signal from such output pressure sensor 64 in specific sampling periods (e.g. 5 milliseconds).

Three-position solenoid valve 61 uses technology known hitherto, and has a configuration such as that disclosed in, for example, "Examined Japanese Utility Model Publication" (JP-B-U) No. H7-31020 (1995). That is, three-position solenoid valve 61 has a first port P1 connected to the atmosphere, a second port P2 connected to air supply reservoir 70, and a third port P3 connected to pressure chamber 60a of relay valve 60. As mentioned earlier, the air pressure output from third port P3 is the output pressure, and this output pressure is monitored by output pressure sensor 64.

Three-position solenoid valve 61 is driven by a current supplied from constant-current control amplifier 62, and can selectively adopt any of three positions: an exhaust position, a supply position, and an overlapping (lap) position. In the exhaust position, first port P1 is connected with third port P3, and the output pressure decreases. In the supply position, second port P2 is connected with third port P3, and the output pressure increases. In the overlapping position, first, second and third ports P1, P2 and P3 are all closed off, and the output pressure is held.

Based on the pressure command signal output by brake control unit 50 and the output pressure signal from output pressure sensor 64, fuzzy control unit 65 uses fuzzy reasoning to calculate and output the command current value as a current value ranging freely between the current at which solenoid valve 61 adopts the supply position and the current at which it adopts the exhaust position. When a current of this command current value is output from constant-current control unit 62, the position of three-position solenoid valve 61 is controlled to the exhaust position, the supply position or the overlapping position.

In this embodiment, the command current value output by fuzzy control unit 65 can adopt an essentially continuous value. Three-position solenoid valve 61 can thus adopt positions that restrict the flow rate, such as an intermediate position between the exhaust position and overlapping position, or an intermediate position between the supply position and overlapping position. For example, at an intermediate position between the exhaust position and the overlapping position, first port P1 and third port P3 are incompletely blocked off and consequently the output pressure gradually decreases. Similarly, at an intermediate position between the supply position and the overlapping position, second port P2 and third port P3 are incompletely blocked off and consequently the output pressure gradually increases.

The volume of the pressure output by three-position solenoid valve 61 is amplified by relay solenoid valve 60 and converted into a brake pressure. This brake pressure is supplied to brake cylinders BC11 and BC12.

Next, the fuzzy reasoning of fuzzy control unit 65 is described. In this embodiment, the fuzzy input is taken to be the difference between the output pressure signal from output pressure sensor 64 and the pressure command signal, or in other words the difference between the output pressure detected by output pressure sensor 64 and the command pressure (brake command pressure) which is the target pressure (this difference in pressure is referred to as the "pressure difference" hereinbelow). Furthermore, the time variation rate of the output signal from output pressure sensor 64, or in other words the time variation rate of the output pressure (referred to as the "output pressure gradient" hereinbelow) is also taken as the fuzzy input. Table 1 below shows one example of the fuzzy rules.

TABLE 1

| | Condition part | |
|---|---|---|
| Rule No. | Output pressure vs. command pressure | Gradient of output pressure | Conclusion part |
| 1 | much larger (PL) | | exhaust (NL) |
| 2 | somewhat larger (PM) | strongly positive (PL) | exhaust (NL) |
| 3 | somewhat larger (PM) | gentle (ZR) | exhaust (NL) |
| 4 | somewhat larger (PM) | strongly negative | lap (ZR) |
| 5 | roghtly equal (ZR) | | lap (ZR) |
| 6 | somewhat smaller (NM) | strongly positive (PL) | lap (ZR) |
| 7 | somewhat smaller (NM) | gentle (ZR) | supply (PL) |
| 8 | somewhat smaller (NM) | strongly negative (NL) | supply (PL) |
| 9 | much smaller (NL) | | supply (PL) |

Rules No. 1, 5 and 9 should be self-explanatory. Rules No. 2, 3 and 4 correspond to the case where the output pressure is somewhat larger than the command pressure. In this case, the gradient of the output pressure is brought into consideration. That is, "exhaust NL" is the fuzzy set of the conclusion part corresponding to the cases where the gradient is strongly positive and where it is gentle, and "lap ZR", which corresponds to the overlapping position, is the fuzzy set of the conclusion part corresponding to the case where the gradient is strongly negative. When the output pressure is larger than the command pressure, it is necessary to reduce the pressure by exhaust. However, when the gradient of the output pressure is strongly negative at the point where the output pressure approaches the command pressure, there is a danger that the output pressure will drop below the command pressure due to the sharp drop in pressure, giving rise to undershoot. Rule No. 4 alleviates this sort of undershoot.

Rules No. 6, 7 and 8 act in a similar fashion. That is, when the output pressure is lower than the command pressure, it is necessary to increase the pressure by supply, but when the gradient of the output pressure is strongly positive at the point where the output pressure approaches the command pressure, there is a danger that an overshoot will occur. Rule No. 6 alleviates this overshoot, and the fuzzy set of this conclusion part is "lap ZR".

Figure 3:
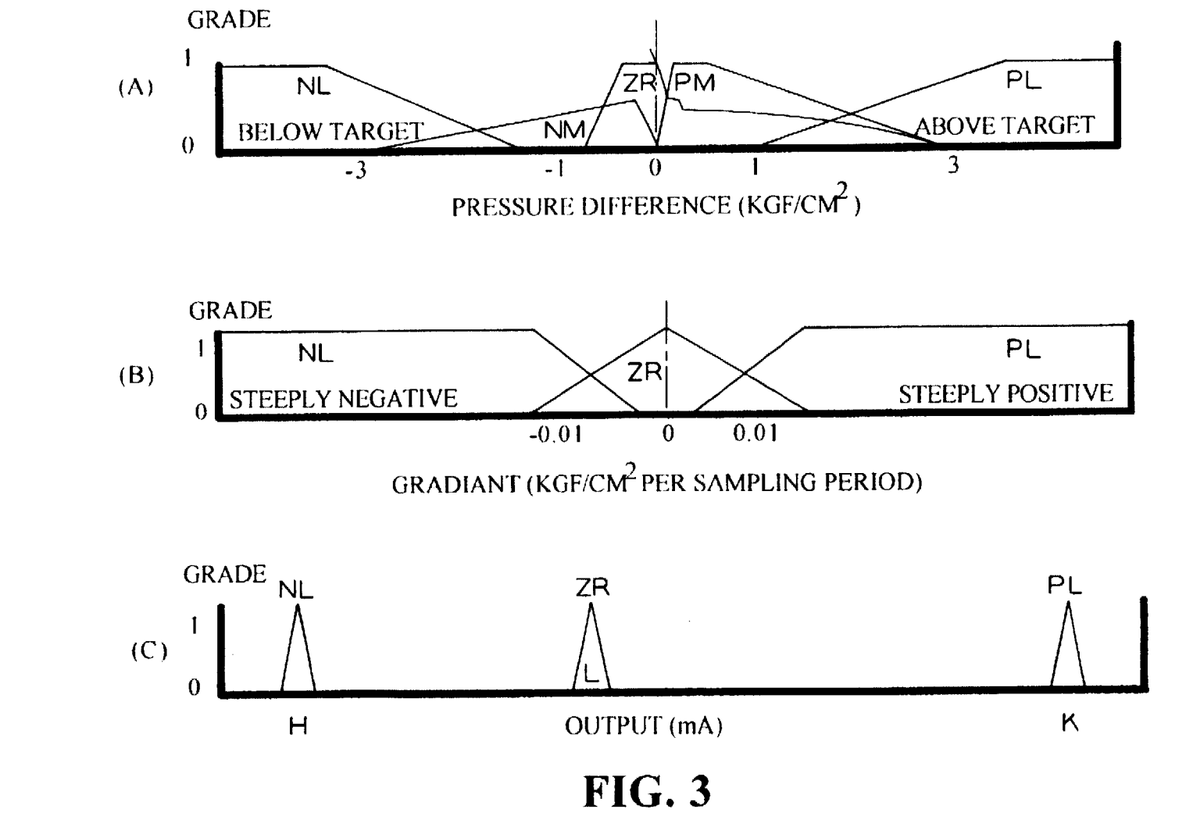
FIG. 3 is a chart showing the membership functions of the condition part and conclusion part of the fuzzy rules, wherein (a) shows the membership functions corresponding to the pressure difference between the output pressure and the command pressure, (b) shows the membership functions corresponding to the gradient of the output pressure, and (c) shows the membership functions corresponding to the command current value.

FIG. 3 shows the membership functions of the condition part and conclusion part. FIG. 3(a) shows the membership functions corresponding to the pressure difference, FIG. 3(b) shows the membership functions corresponding to the gradient of the output pressure, and FIG. 3(c) shows the membership functions of the conclusion part corresponding to the command current value.

The membership functions shown in FIG. 3(a) respectively correspond to the fuzzy set "PL", which corresponds to the output pressure being much larger than the command pressure, fuzzy set "PM", which corresponds to the output pressure being somewhat larger then the command pressure, fuzzy set "ZR", which corresponds to the output pressure being roughly equal to the command pressure, fuzzy set "NM", which corresponds to the output pressure being somewhat smaller then the command pressure, and fuzzy set "NL", which corresponds to the output pressure being much smaller than the command pressure.

The membership function corresponding to fuzzy set "PL" rises up gently from the region of a 1 kgf/cm$^2$ pressure difference, and its grade reaches 1.0 near a pressure difference of over 3 kgf/cm$^2$. Also, the membership function corresponding to fuzzy set "PM" rises up steeply in the region of a 0 kgf/cm$^2$ pressure difference, its grade will become less than 1.0 from near a 0.5 kgf/cm$^2$ pressure difference, and the grade decreases gently in the region up to a 3.0 kgf/cm$^2$ pressure difference. The membership function corresponding to fuzzy set ZR rises up fairly steeply from near a −0.6 kgf/cm$^2$ pressure difference, has a grade of 1.0 in the region of pressure differences from −0.2 kgf/cm$^2$ to near 0 kgf/cm$^2$, drops off steeply at a pressure difference of 0 kgf/cm$^2$, and then extends up to the region of 3 kgf/cm$^2$ without changing its gradient. The membership function corresponding to fuzzy set "NM" rises up gently from near a pressure difference of −3 kgf/cm$^2$, its grade peaks at 0.5 near a pressure difference of −0.1 kgf/cm$^2$, and thereafter it drops off steeply toward a pressure difference of 0 kgf/cm$^2$. The membership function corresponding to fuzzy set "NL" has a grade of 1.0 in the region below a pressure difference of about −3.5 kgf/cm$^2$, the grade gently decreasing in the region of greater pressure difference, and becoming zero near a pressure difference of −1.5 kgf/cm$^2$.

When the case of a zero pressure difference is taken as a base point, it can be seen that the membership functions are asymmetric between positive and negative pressure differences. This results from giving consideration to the hysteresis characteristics of three-position solenoid valve 61. That is, when the spool for driving the valve body disposed within such three-position solenoid valve 61 is driven in one direction, the resistance force due to the springs pressing on the valve body and on the mechanical friction of the seal members and the like differs from when it is driven in the other direction. Consequently, when the brake pressure is to be increased or decreased, the driving current applied to three-position solenoid valve 62 must be changed. By using the asymmetric membership functions, it is possible to eliminate the hysteresis effects and to control three-position solenoid valve 62 satisfactorily.

When determining the membership functions of FIG. 3(a) corresponding to the pressure difference between the output pressure and the command pressure, it is preferable to evaluate some or all of the following: step braking, step releasing, stepping, single-step braking, analog increase, and analog decrease. Step braking is a way of applying the brakes so that the brake pressure is increased by specific increments in a stepwise fashion. Also, step releasing is a way of releasing the brakes so that the brake pressure is decreased by specific increments in a stepwise fashion. Furthermore, stepping is varying the brake pressure by two or more steps at a time.

Single-step braking is the application of brake pressure from the zero state to the fourth or higher step in one go. Also, analog increase and analog decrease are the continuous monotonic increase and decrease of brake pressure. Items that can be evaluated when the brake pressure is changed are the size of the overshoot or undershoot, and the size of the difference between the output pressure and command pressure.

FIG. 3(b) shows the membership functions respectively corresponding to fuzzy set "NL", which corresponds to a sudden negative change in the output pressure, fuzzy set "ZR", which corresponds to a gentle change in the output pressure, and fuzzy set "PL", which corresponds to a sudden positive change in the output pressure. The membership function corresponding to fuzzy set "NL" has a grade of 1.0 in the region where the gradient of the output pressure is less than about $-0.017$ kgf/cm$^2$ per sampling period, the grade then falls off gradually at higher gradients, and the grade becomes zero at a gradient of generaally about $-0.005$ kgf/cm$^2$ per sampling period. Also, the membership function corresponding to fuzzy set "ZR" rises up from near a gradient of $-0.0017$ kgf/cm$^2$ per sampling period, reaches a grade of 1.0 at a gradient of 0 kgf/cm$^2$ per sampling period, then gradually falls away again so that the grade becomes zero near a gradient of 0.017 kgf/cm$^2$ per sampling period. Furthermore, the membership function corresponding to fuzzy set "PL" rises up near a gradient of 0.005 kgf/cm$^2$ per sampling period, and the grade becomes 1.0 above a gradient of about 0.017 kgf/cm$^2$ per sampling period.

As can be seen from FIG. 3(b), the membership functions relating to the gradient of the output pressure have a shape that is symmetrical about the negative region and positive region, taking zero as a base point. The membership functions of the conclusion part shown in FIG. 3(c) are simple. That is, the command current values corresponding to the exhaust, overlapping and supply positions are triangular functions centered on H mA (milliamps), L mA and K mA respectively.

Figure 4:
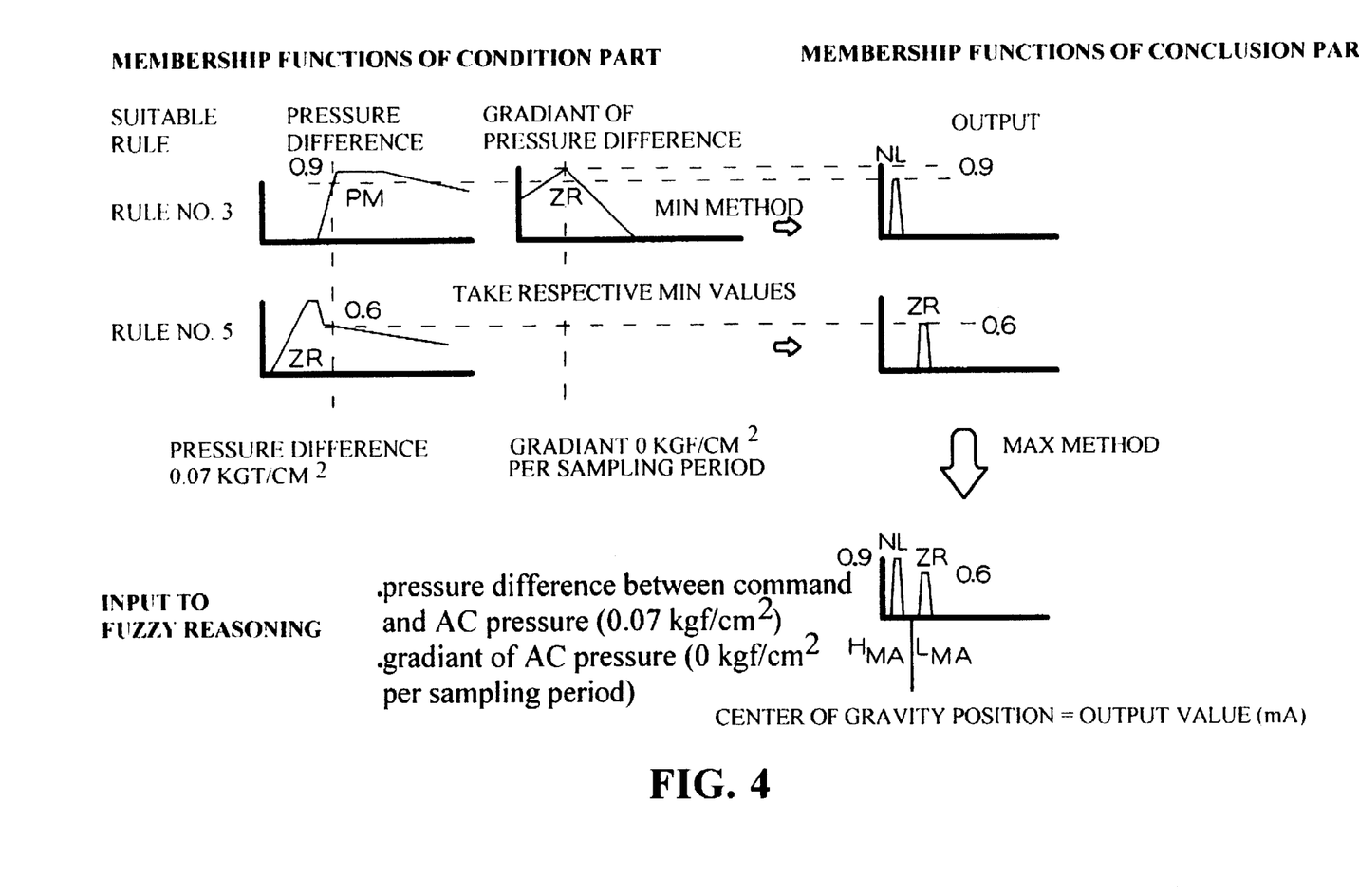
FIG. 4 is a chart for explaining one example of the fuzzy reasoning wherein MIN-MAX is applied for use in the evaluation of the fuzzy rules and the center-of-gravity method is applied for de-fuzzification.

FIG. 4 explains the fuzzy reasoning process when MIN-MAX is applied for the evaluation of the fuzzy rule and when a center-of-gravity method is applied for de-fuzzification. An example of the input to the fuzzy reasoning is as follows:

pressure difference between output pressure and command pressure: 0.07 kgf/cm$^2$ gradient of output pressure: 0 kgf/cm$^2$ per sampling period The membership functions corresponding to the fuzzy sets "PM" and "ZR" have meaningful grades with respect to the pressure difference of this input example. That is, the grade for fuzzy set "PM" is 0.9, and the grade for fuzzy set "ZR" is 0.6. Also, the membership function for fuzzy set "ZR", whose grade is 1.0, has a meaningful grade with respect to the gradient of the abovementioned input example. It can thus be seen that of the fuzzy rules in the abovementioned Table 1, the applicable rules are rule No. 3 and rule No. 5.

In the MIN method, the smaller value of the outputs corresponding to two conditions is taken as the final output, so that the output for rule No. 3 is 0.9. The conclusion part is thus the fuzzy set "NL" of grade 0.9. Also, the output for rule No. 5 is 0.6, and the fuzzy set "ZR" of grade 0.6 is obtained as the conclusion part.

The fuzzy sets of the conclusion part obtained in this way are synthesized with the MAX method, and furthermore, the command current value is obtained by finding the center of gravity. In this case, the center of gravity (the command current value) may be found based on the surface areas of the membership functions of the fuzzy sets "NL" and "ZR" after synthesis, and the command current value may be determined by the following formula.

$$(\text{command current value}) = \frac{H \cdot 0.9 + L \cdot 0.6}{0.9 + 0.6}$$

Figure 5:
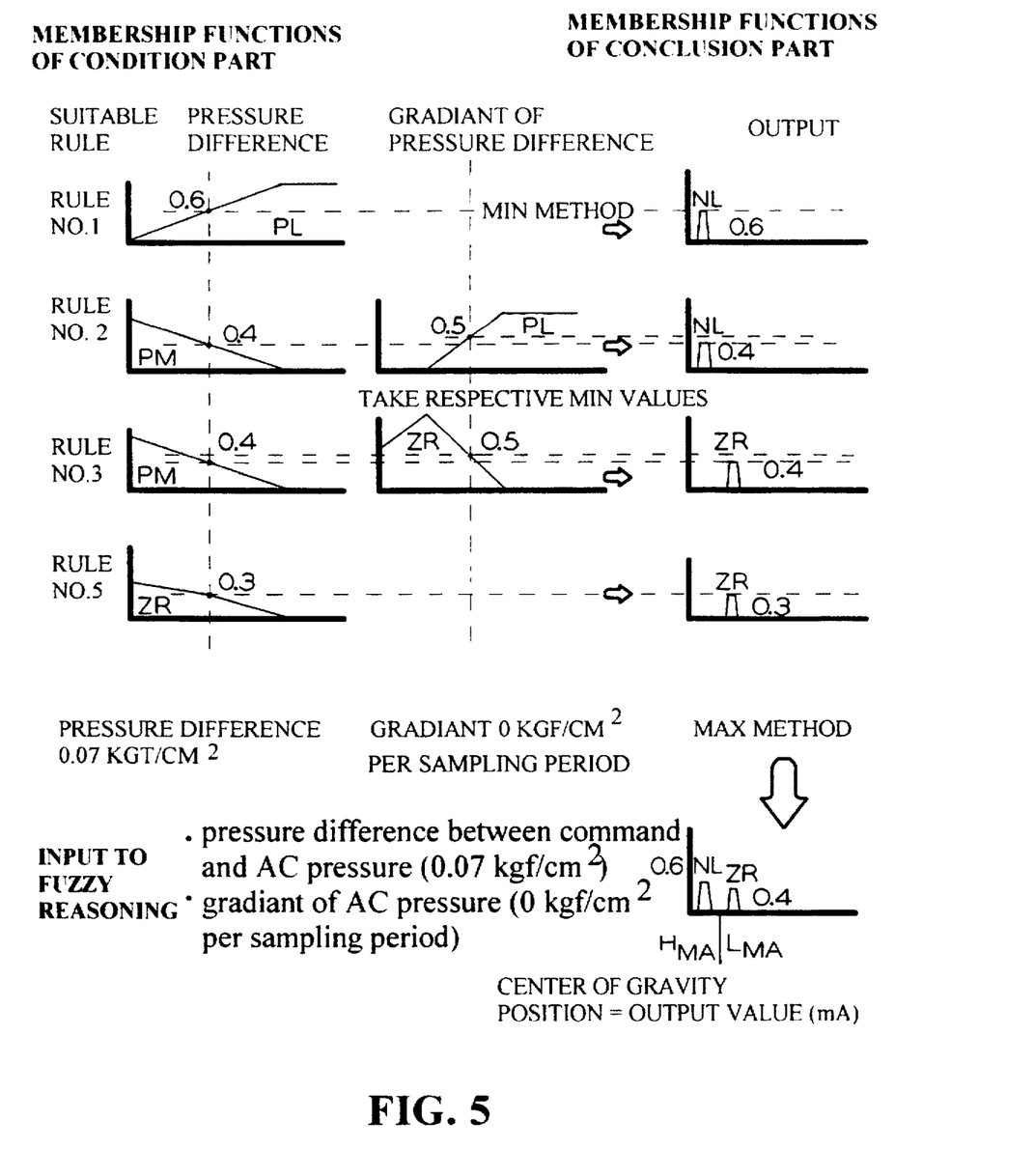
FIG. 5 is a chart for describing another example of fuzzy reasoning.

FIG. 5 shows an example of the reasoning for another input example. The input example is as follows:

pressure difference between output pressure and command pressure: 1.5 kgf/cm$^2$ gradient of output pressure: 0.01 kgf/cm$^2$ per sampling period For a pressure difference of 1.5 kgf/cm$^2$, the membership functions of fuzzy sets "PL" and "PM" each have meaningful values. Also, for an output pressure gradient of 1.5 kgf/cm$^2$ per sampling period, fuzzy sets "PL" "ZR" have meaningful values. Thus of the fuzzy rules in Table 1, rules No. 1, No. 2, No. 3 and No. 5 are applicable. Therefore, when the condition part is evaluated by applying the MIN method to each rule for, fuzzy set "NL" of grade 0.6 is obtained for rule No. 1, fuzzy set "LN" of grade 0.4 is obtained for rule No. 2, fuzzy set "ZR" of grade 0.4 is obtained for rule No. 3, and fuzzy set "ZR" of grade 0.3 is obtained for rule No. 5.

A synthesized membership function is therefore obtained by applying the MAX method to synthesize the fuzzy sets of the conclusion parts obtained corresponding to each rule, including fuzzy set "NR" of grade 0.6 and fuzzy set "ZR" of grade 0.4. The command current value is obtained by de-fuzzifying this synthesized membership function by applying the center-of-gravity method.

With this embodiment, a command current value corresponding to the current to be applied to three-position solenoid valve 61 is thus calculated by fuzzy reasoning and output, taking the gradient of the output pressure and the difference between the command pressure and the output pressure detected by output pressure sensor 64 as the fuzzy input 65. In this way, a current of a suitable value according to the relationship between the output pressure and command pressure and the behavior of the output pressure is input into three-position solenoid valve 61. Feedback control is thus performed based on the detected output pressure, so that three-position solenoid valve 61 can be suitably controlled.

Also, in this embodiment, the current value input to such three-position solenoid valve 61 can take an essentially continuous value, so that it can be controlled smoothly compared with the prior art in which the three-position solenoid valve is controlled with a three-level or four-level discrete current. More specifically, since it is possible to control three-position solenoid valve 61 in gentle exhaust states and gentle supply states, it is possible to prevent sudden decreases or increases in pressure in the stage where the output pressure has approached the command pressure. In this way, it is possible to suppress or prevent overshoot and undershoot, and it is thus possible for the output pressure to approach the command pressure rapidly. Since this means that the brake pressure that acts during braking rapidly approaches the target pressure, the damping characteristics of the railroad car are thereby improved.

Also, by avoiding overshoot and undershoot, three-position solenoid valve 61 is not controlled by frequently switching it a large number of times, and the lifetime of three-position solenoid valve 61 is thereby increased. In this way, the longevity and reliability of the railway vehicle brake device can be increased.

Embodiments of this invention are not limited to the one described above. For example, although fuzzy reasoning is used in the embodiment mentioned above, the output of output pressure sensor 64 and the pressure command signal can be input to a differential amplifier circuit, and the output of this differential amplifier circuit can be input to constant-current amplifier 62 as the command signal. Since the output current of constant-current amplifier 62 can also take a continuous value in this configuration, three-position solenoid valve 61 can adopt an overlapping position close to the exhaust or air intake position. Consequently, overshoot and undershoot can be effectively prevented.

Also, in this embodiment, the command current value output by fuzzy control unit 65 was assumed to be capable of adopting a continuous value, but it could alternatively be capable of adopting only discrete values as long as there are a sufficient number of them.

Furthermore, the membership functions in the description are only one example of such, and needless to say the membership functions can be tuned according to the preferred and/or required degree of precision.

Also, the fuzzy reasoning method, in the above description, is just one example of such, and there are other rule evaluation and de-fuzzification methods that can also be applied, such as, for example, the maximum/algebraic product method or the alpha IDM method.

Furthermore, in the above embodiment, the example was described where the brake pressure was controlled for each axle, but the brake pressure may also be controlled for each truck instead.

The solenoid valve control device of this invention can, of course, be applied to the control of other three-position solenoid valves besides the three-position solenoid valves that are used for the brake pressure control, and can be altered in various ways without departing from the scope of the technology described in the appended claims.

As described above, with an invention according to a first embodiment the detected value of the output pressure output by the three-position solenoid valve is fed back, and the command current value is calculated based on the difference between the output signal corresponding to this output pressure and the pressure command signal, such that the output pressure signal approaches the pressure command signal.

Consequently, it is possible to control the three-position solenoid valve more appropriately than in the prior art, where the command current value could only adopt either three-level or four-level fixed values, and it is thus possible to suppress or prevent overshoot and undershoot and to make the output pressure converge rapidly on the command pressure. In this way, it is possible to improve the responsivity of the solenoid valve. Furthermore, since it is possible to prevent the three-position solenoid valve from being frequently switched over, it is possible to improve the longevity and reliability of the three-position solenoid valve.

With an invention, according to a second embodiment, the command current value is calculated by factoring in the temporal rate of change of the output pressure signal when the output pressure signal has approached the pressure command signal. In this way, since the output pressure approaches the command pressure gently near the pressure command signal, overshoot and undershoot can be suppressed. In this way, since the output pressure can be made to converge on the command pressure even more rapidly, the damping characteristics of the solenoid valve device can be ameliorated.

With an invention according to another embodiment, the driving force applied to the three-position solenoid valve differs when increasing and decreasing the output pressure in order to approach the command pressure. In this way, it is possible to cancel the effects of the hysteresis characteristics of the driving resistance force of the three-position solenoid valve, and the three-position solenoid valve can be satisfactorily controlled. As a result, the command pressure can be accurately controlled.

With an invention according to still other embodiments, the command current value may be calculated by fuzzy reasoning, so that the command current value can be calculated by a relatively simple software process so that overshoot and undershoot do not occur.

With an invention according to still other embodiments, the time variation rate of the output pressure signal is included in the input to the fuzzy reasoning, so that the same effect can be achieved by a simple software process.

In the invention according to still another embodiment, by the application of fuzzy reasoning, it is possible to obtain the same effect as another embodiment of the invention by a simple software process.

It can be seen from the above description that with a solenoid valve control device of the present invention, the output pressure that is output from the three-position solenoid valve is detected by an output pressure detecting means. The detection result of this output pressure detecting means is fed back to the command current value calculating means, which calculates a command current value used for controlling the three-position solenoid valve.

The command current value calculating means compares the output pressure signal from the output pressure detecting means with the pressure command signal, and calculates the command current value based on the difference between the two. This command current value is a value that can be utilized to control the three-position solenoid valve so that the output pressure signal is made to match the pressure command signal.

The command current value calculated by the command current value calculating means is set to a current value ranging freely between the current value at which the three-position solenoid valve adopts the supply position and the current at which it adopts the exhaust position, but this command current value is preferably made capable of taking an essentially continuous value.

In this way, it is possible to set the three-position solenoid valve at intermediate positions between the exhaust position and overlapping position, and at intermediate positions between the supply position and overlapping position. At these intermediate positions, it can be made to perform gentle exhaust or supply. It is thus able to suppress or prevent undershoot and overshoot due to sudden exhaust or supply.

Another embodiment of the invention is characterized in that, in the solenoid valve control device described above, the command current value calculating means calculates the command current value by factoring in the time variation rate of the output pressure signal from the output pressure detecting means when the difference between the output pressure signal from the output pressure detecting means and the pressure command signal has a value within a specific range.

With this configuration, the time variation rate of the output pressure signal is factored into the calculation of the command current value when the output pressure signal is close to the pressure command signal. For example, when the output pressure is only slightly higher than the command pressure corresponding to the pressure command signal and the time variation rate of the output pressure is negative with a large absolute value, it is preferable to calculate a command current value that can set the three-position solenoid valve into a gentle exhaust state. In this way, when the output pressure has suddenly approached the command pressure while the output pressure is falling due to the exhaust, the exhaust rate is reduced near the command pressure. It is thus possible to make the output pressure converge rapidly on the command pressure by effectively suppressing or preventing undershoot.

In the same way, when the output pressure is slightly lower than the command pressure and the time variation rate of the output pressure is large and positive, it is preferable to calculate a command current value that can set the three-position solenoid valve into a gentle supply state. In this way, the rate of pressure increase is reduced near the command pressure when the supply pressure suddenly approaches the command pressure due to the supply. Consequently, it is possible to effectively suppress or prevent overshoot, and the output pressure can thus be made to converge rapidly on the command pressure.

Another embodiment of the invention is characterized in that, in the solenoid valve control device when the difference between the output pressure signal quantity from the output pressure detecting means and the pressure command signal quantity is either positive or negative, the above-mentioned command current value calculating means calculates the command current value so that the ratio of the variation of the command current value differs with respect to the difference.

With this configuration, when the difference between the output pressure signal quantity and the pressure command signal quantity is positive or negative, the ratio of the variation of the command current value differs with respect to the difference. In other words, the driving force applied to the three-position solenoid valve differs according to whether the output pressure is increasing or decreasing in order to approach the command pressure.

In this way, even when the three-position solenoid valve exhibits so-called hysteresis characteristics whereby the driving resistance force of the three-position solenoid valve differs between going from the exhaust position to the overlapping position and going from the supply position to the overlapping position, this effect can be eliminated. That is, by controlling the three-position solenoid valve properly, the desired brake pressure can be reliably produced irrespective of the hysteresis characteristics of the driving resistance force.

A further embodiment of the invention, as described above, is characterized in that, in the solenoid valve control device, the command current value calculating means is a fuzzy control means that calculates the command current value by fuzzy reasoning, taking the difference between the output pressure signal from the output pressure detecting means and the pressure command signal as its input.

In this configuration, fuzzy reasoning is applied and, by means of simple software processing, it is thereby possible to calculate the command current value so that overshoot and undershoot do not occur.

In still another embodiment, of the present invention, it is preferable that the output pressure signal from the output pressure detecting means is compared with the pressure command signal, and the above-mentioned fuzzy control means calculates the command current value by using the membership functions of fuzzy sets corresponding respectively to "much larger", "somewhat larger", "roughly equal", "somewhat smaller", and "much smaller".

Yet another embodiment is characterized in that, in a solenoid valve control device the command current value calculating means is a fuzzy control means that obtains the command current value by fuzzy reasoning, taking the difference between the output pressure signal from the output pressure detecting means and the pressure command signal, and the time variation rate of the output pressure signal from the output pressure detecting means as its input.

Clearly, fuzzy reasoning is also applied in this configuration. The difference in this embodiment is that the time variation rate of the output signal is included in the input to the fuzzy reasoning. Since a suitable command current value is thereby calculated according to the direction and rate of change of the pressure, overshoot and undershoot can be suppressed or prevented even more effectively.

In a further embodiment, it is preferable that the output pressure signal from the output pressure detecting means is compared with the pressure command signal, and the fuzzy control means calculates the command current value by using the membership functions of fuzzy sets corresponding respectively to "much larger", "somewhat larger", "roughly equal", "somewhat smaller", and "much smaller", and by using the membership function of a fuzzy set corresponding respectively to whether the time variation rate of the output pressure signal from the output pressure detecting means is "large and positive", "roughly zero", or "negative with a large absolute value".

Still another embodiment of the invention is characterized in that, in a solenoid valve control device the output pressure signal from the output pressure detecting means is compared with the pressure command signal, and the membership functions of the fuzzy sets respectively corresponding to "much larger", "somewhat larger", "roughly equal", "somewhat smaller", and "much smaller" are set so as to be asymmetric about the point where the difference between the output pressure signal and pressure command signal is zero.

With this configuration, fuzzy reasoning is still applied and the effect mentioned in a previous embodiment can be achieved. That is, it is possible to implement accurate control of the output pressure by eliminating the hysteresis characteristics relating to the driving resistance force of the three-position solenoid valve.

While a presently preferred and a number of alternative embodiments of the present invention have been described in detail above, it should be understood that various other adaptations and/or modifications of the three-position solenoid may be envisioned by those persons who are skilled in the relevant art without departing from either the spirit of the invention or the scope of the appended claims.

We claim:

1. A solenoid valve control device for a three-position solenoid valve that is controlled by receiving a command current value corresponding to a pressure command signal, rendering said solenoid valve switchable between a supply position which increases an output pressure, an exhaust position which decreases such output pressure, and an overlapping position which holds such output pressure, characterized in that it has:

(a) an output pressure detecting means that detects said output pressure of said solenoid valve;

(b) a fuzzy control means for comparing an output pressure signal from said output pressure detecting means with said pressure command signal and, based on a difference therebetween and on a time variation rate of said output pressure signal, calculating said command current value so as to make said output pressure signal match said pressure command signal, said fuzzy control means calculating said command current value by using membership functions of fuzzy sets corresponding respectively to "much larger", "somewhat larger", "roughly equal", "somewhat smaller", and "much smaller" with respect to said output pressure signal against said pressure command signal, and by using membership functions of fuzzy sets corresponding respectively to whether said time variation rate is "large and positive", "roughly zero", or "negative with a large absolute value"; and (c) in that said command current value is capable of ranging freely between (i) said current value at which said solenoid valve adopts said supply position wherein second and third ports of said solenoid valve communicate to direct said output pressure from a reservoir to a pressure operative device and (ii) said current value at which said solenoid valve adopts said exhaust position wherein said third port and a first port of said solenoid valve communicate to vent such pressure operative device to atmosphere.

2. A solenoid valve control device, according to claim 1, characterized in that said fuzzy control means calculates said command current value by factoring in said time variation rate of said output pressure signal when said difference between said output pressure signal and said pressure command signal has a value within a specific range.

3. A solenoid valve control device, according to claim 1, characterized in that when there is a pressure difference between an output pressure signal quantity from said output pressure detecting means and a pressure command signal quantity, whether said pressure difference is positive or negative, said fuzzy control means calculates said command current value so that a ratio of a variation of said command current value differs with respect to said pressure difference.

4. A solenoid valve control device, according to claim 2, characterized in that when there is a difference between an output pressure signal quantity from said output pressure detecting means and a pressure command signal quantity, whether said pressure difference is positive or negative, said fuzzy control means calculates said command current value so that a ratio of a variation of said command current value differs with respect to said pressure difference.

5. A solenoid valve control device, according to claim 1, characterized in that said membership functions of fuzzy sets respectively corresponding to "much larger", "somewhat larger", "roughly equal", "somewhat smaller", and "much smaller" are set so as to be asymmetric about a point where a difference between said output pressure signal and said pressure command signal is zero.

6. A solenoid valve control device, according to claim 2, characterized in that said membership functions of fuzzy sets respectively corresponding to "much larger", "somewhat larger", "roughly equal", "somewhat smaller", and "much smaller" are set so as to be asymmetric about a point where a difference between said output pressure signal and said pressure command signal is zero.

7. A solenoid valve control device, according to claim 3, characterized in that said membership functions of the fuzzy sets respectively corresponding to "much larger", "somewhat larger", "roughly equal", "somewhat smaller", and "much smaller" are set so as to be asymmetric about a point where a difference between said output pressure signal and said pressure command signal is zero.

8. A solenoid valve control device, according to claim 4, characterized in that said membership functions of the fuzzy sets respectively corresponding to "much longer", "somewhat larger", "roughly equal", "somewhat smaller", and "much smaller" are set so as to be asymmetric about a point where a difference between said output pressure signal and said pressure command signal is zero.

* * * * *